US007090227B2

(12) United States Patent
Morin

(10) Patent No.: US 7,090,227 B2
(45) Date of Patent: Aug. 15, 2006

(54) SKI SLED WITH BOOT BLOCKS AND RIDE-OPERATED WEIGHT TRANSFER DEVICE FOR STEERING

(76) Inventor: Matthew J. Morin, 21611 Goodwin Ct., Ashburn, VA (US) 20148

( * ) Notice: Subject to any disclaimer, the term of this patent is extended or adjusted under 35 U.S.C. 154(b) by 14 days.

(21) Appl. No.: 10/753,414

(22) Filed: Jan. 9, 2004

(65) Prior Publication Data

US 2004/0251645 A1    Dec. 16, 2004

Related U.S. Application Data

(60) Provisional application No. 60/439,024, filed on Jan. 10, 2003.

(51) Int. Cl.
    *B62B 13/08*    (2006.01)
(52) U.S. Cl. ................ 280/14.1; 280/16; 280/21.1; 280/22.1
(58) Field of Classification Search ............ 280/14.1, 280/16, 21.1, 22.1, 809, 816, 812, 20
    See application file for complete search history.

(56) References Cited

U.S. PATENT DOCUMENTS

| 3,528,674 | A | * | 9/1970 | Schwarz ................. 280/22.1 |
| 3,799,564 | A | * | 3/1974 | Eisenschmid ............ 280/14.1 |
| 4,101,142 | A | | 7/1978 | Turner |
| 4,168,843 | A | | 9/1979 | Hager |
| 4,219,207 | A | * | 8/1980 | Muir et al. ............. 280/22.1 |
| 4,324,409 | A | * | 4/1982 | Larsen et al. ........... 280/14.1 |
| 4,334,691 | A | * | 6/1982 | Scheib ................... 280/14.1 |
| 4,561,666 | A | | 12/1985 | Aumann |
| 5,335,925 | A | | 8/1994 | Dolson |
| 5,413,363 | A | | 5/1995 | Colin et al. |
| 6,241,265 | B1 | | 6/2001 | Kovar et al. |

OTHER PUBLICATIONS

"Snow Slider Walker" product description, http://www.freedomfactory.org/slider.htm, Jul. 8, 2002.*
"Strange Research + Development", pp. 1 and 2, Spokes 'n Motion, 2002.
"Disabled Sports USA, Winter/Summer Sports Equipment Resources", pp. 1-6.
"Ski Biking: Seat-of-Your-Pants Fun", The Washington Post, Feb. 2, 2003.
"Alpine Trekker" product description, www.bcaccess.com, May 18, 2004.

* cited by examiner

*Primary Examiner*—Christopher P. Ellis
*Assistant Examiner*—John Walters
(74) *Attorney, Agent, or Firm*—Birch, Stewart, Kolasch & Birch, LLP

(57) ABSTRACT

A ski sled with adjustable boot blocks and a rider-operated weight-transfer device for rider-controlled steering. The boot blocks are provided with fixed and/or variable angle adjustment devices for changing the angle of the ski bottoms with respect to the snow surface, and the toe-in angle of the skis with respect to each other. Further, the boot blocks are provided with lengthwise adjustment mechanisms so that the boot blocks may be attached to any standard ski binding used on any ski without modification or any special attachments to the bindings or the skis.

20 Claims, 16 Drawing Sheets

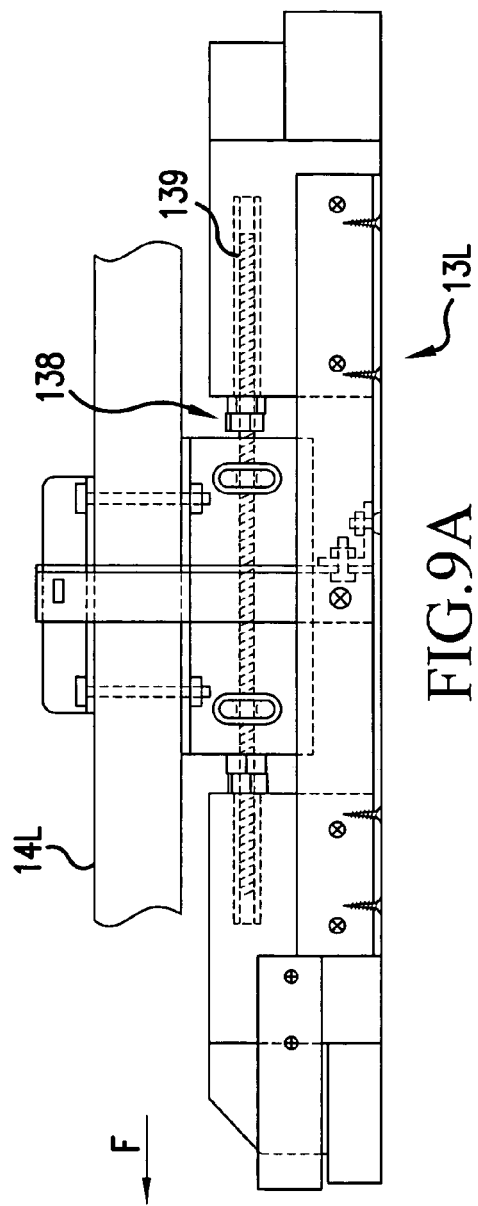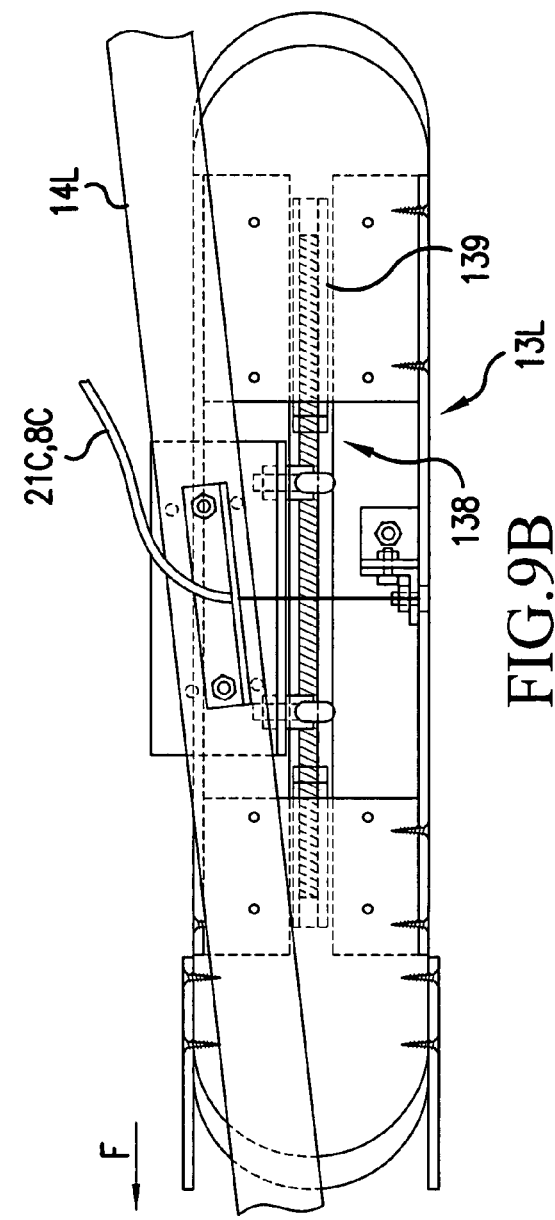

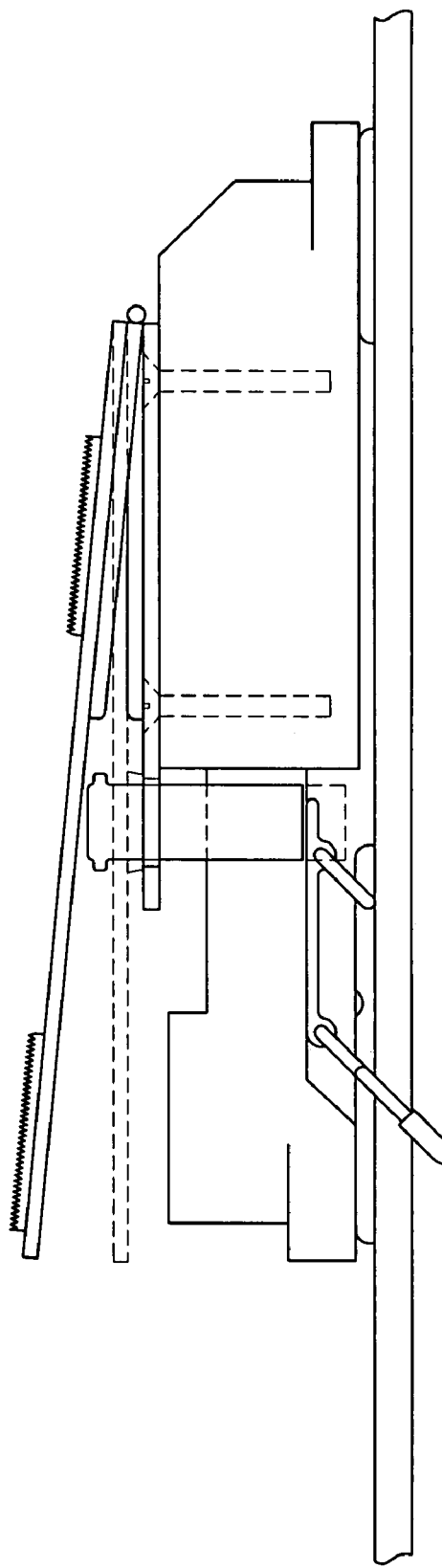
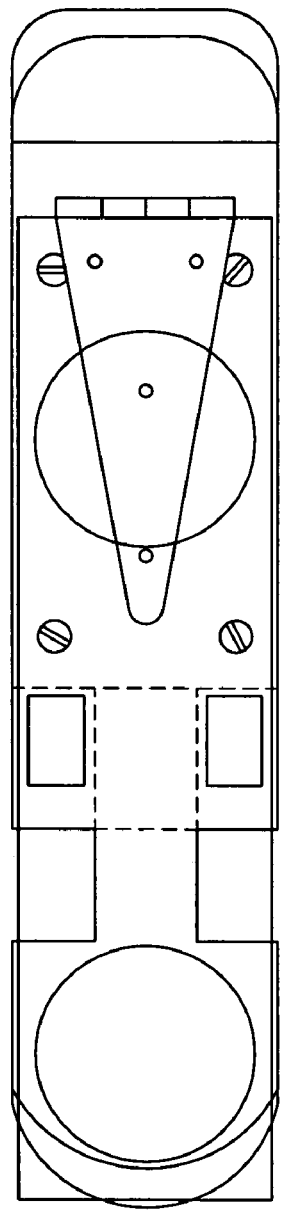
FIG.11C
FIG.11D

SKI SLED WITH BOOT BLOCKS AND RIDE-OPERATED WEIGHT TRANSFER DEVICE FOR STEERING

CROSS-REFERENCE TO RELATED APPLICATION

The present application claims priority to Provisional Application No. 60/439,024, filed Jan. 10, 2003, the entire contents of which are hereby incorporated by reference.

BACKGROUND OF THE INVENTION

1. Field of the Invention

The present invention relates to a ski sled with boot blocks and a rider-operated weight-transfer device for steering. The boot blocks are provided with fixed and/or variable angle adjustment devices for changing the angle of the ski bottoms with respect to the snow surface, and the toe-in angle of the skis with respect to each other. Further, the boot blocks are provided with lengthwise adjustment mechanisms so that the boot blocks may be attached to any standard ski binding used on any ski without modification or any special attachments to the bindings or the skis.

2. Description of Background Art

A variety of snow sleds are available, some requiring the rider to be in a lying down, prone position, while others are provided with a seat. Conventionally, in order for a snow sled to be steerable, either of two mechanisms is used. In the first steering mechanism, the sled has two runners fixed to a mid and rear portion the sled body. The front end of these runners are not fixed to the sled body and can be flexed laterally with respect to the direction of travel, thus enabling the sled to turn. In the second steering mechanism, one or two runners are attached at the front of the sled body by means of a pivot mechanism, thus allowing them to be turned laterally with respect to the direction of travel. Two more runners are fixed to the sled body rearward of the front runner(s).

Each of the above steering mechanisms is complicated. Moreover, conventional sleds do not emulate the experience of skiing.

SUMMARY AND OBJECT OF THE INVENTION

One object of the present invention is to solve the above-mentioned problems, by providing a simple snow sled created with a seat with a weight transfer device for steering. Another object of the present invention is to provide a simple device for attaching the seat body to runners or skis, the attachment device being adjustable in a longitudinal direction and pivotable about a longitudinal axis thereof.

According to a first aspect of the present invention, two skis are arranged side-by-side, the skis having forward tips arranged closer together than rear ends thereof, and inward edges angled downwardly at least while the sled is turning; a seat is supported by two legs, each of the legs being rotatably attached at a pivot point at a rear end of a chair rail; adjustable blocks fit into ski bindings on the skis, the blocks having angle adjustment devices mounted thereon for changing lateral pitches of the two skis, the chair rails being attached to the angle adjustment devices and the angle adjustment devices being attached to the blocks forward of the pivot points; and a weight transfer device operable by a rider is provided for transferring a partial weight of the rider from one of the two skis to the other, thus enabling the ski sled to turn.

With this novel invention, a user is able to use his existing skis, and by attaching a seat thereto, is able to create another sporty snow vehicle. Further, the user is able to change the pitch of the skis to accommodate different terrains.

According to a second aspect of the present invention, the weight transfer device of the ski sled includes hand-levers mounted adjacent to each side of the seat; cables extending from the hand-levers and being connected to the angle adjustment devices so that when the hand lever on one side of the sled is pulled, the block on an opposite side of the sled is articulated; right and left connecting members having lower ends attached to forward portions of the chair rails, and upper ends attached to right and left sides of a pivot member pivotably attached to the seat.

With this novel aspect of the present invention, the user is able to steer the ski sled by shifting the weight from one ski to another by pulling on either the right or the left hand lever.

According to a third aspect of the present invention, the weight transfer mechanism includes weight transfer device includes chair rail extensions extending forwardly from the chair rails; foot pedals rotatably attached to the chair rail extensions for actuating cables connected to the angle adjustment devices so that when the foot pedal on one side of the sled is pushed, the block on the same side of the sled is articulated.

With this novel aspect of the present invention, the user is able to steer using foot pedals.

According to a fourth aspect of the present invention, the boot blocks include a forward section having a toe piece and a rear hole; a rear section having a heel piece and a forward extension, the forward extension being inserted into the rear hole of the front section, the forward section being provided with an adjuster screw mechanism for adjusting a longitudinal position of the forward section relative to the rear section, so that the adjustable blocks are capable of fitting multiple ski bindings of the skis; an adjustable bracket attachable to the blocks in a plurality of different angles with respect to the longitudinal direction of the blocks to accommodate different toe-in angles of skis to which the blocks are mounted.

With this aspect of the invention, the boot blocks are usable with any standard ski bindings, and provide for easy toe-in adjustment to accommodate riders of different abilities.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 1(a)–(c) illustrate a first embodiment of the ski sled of the present invention equipped with a hand-operated weight transfer device, in which FIG. 1(a) is a side view, FIG. 1(b) is a front view, and FIG. 1(c) is a plan (top down) view;

FIGS. 2(a)–(c) illustrate a second embodiment of the ski sled of the present invention equipped with foot-operated weight transfer device, in which FIG. 2(a) is a side view, FIG. 2(b) is a front view, and FIG. 2(c) is a plan (top down) view;

FIGS. 9(a) and (b) show side and top down views of the left chair rail attached to the left articulating boot block through a variable angle adjustment device equipped with an infinite angle pivot adjuster;

DETAILED DESCRIPTION OF THE PREFERRED EMBODIMENTS

Figure 1A:
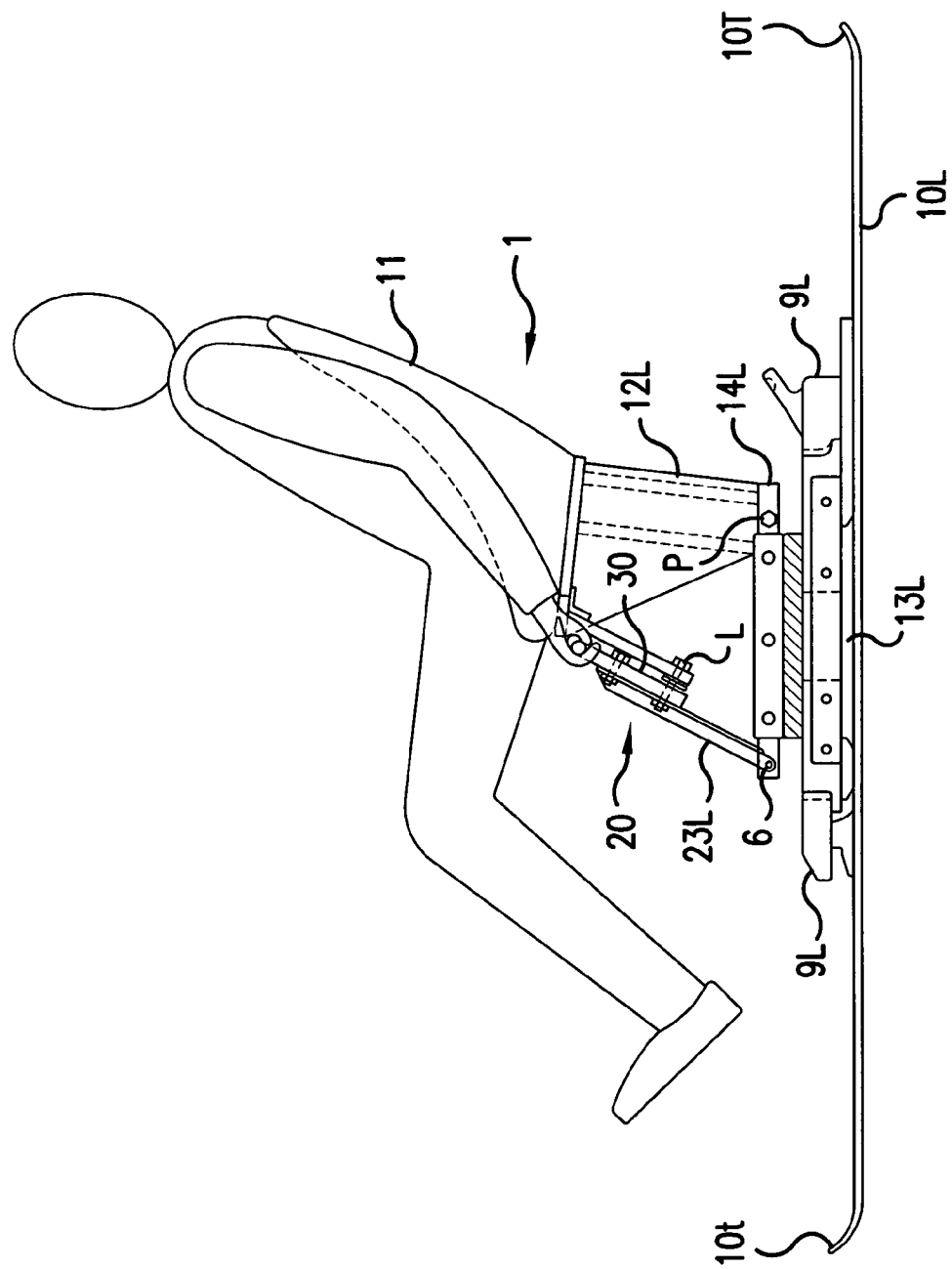

The first embodiment will be described with reference to FIGS. 1(a)–(c). FIG. 1(a) shows a side view of the ski sled 1, including left ski 10L with ski tip 10t and ski tail 10T, seat 11, left leg 12L, left chair rail 14L, left leg 12L being rotatably connected to the left chair rail 14L at pivot pin P, left adjustable boot block 13L, hand-operated weight transfer device 20 connnected to the seat at pivot pin L, and left connecting member 23L.

Figure 1B:
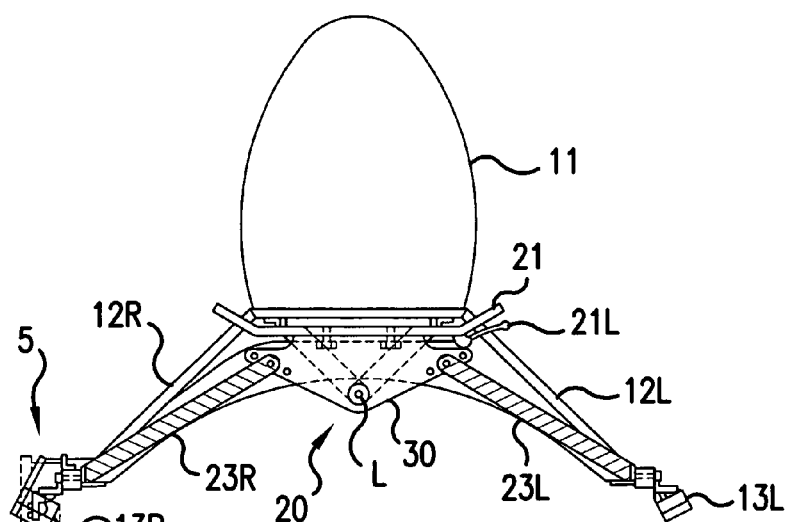

FIG. 1(b) is a front view of the seat 11 (shown is a bucket go-cart seat, however as described below, other seat types a possible) and weight transfer device 20 of the first embodiment of the present invention. The weight transfer device 20 includes handle bar 21 equipped with hand levers 21L, 21R for articulating left and right boot blocks 13L, 13R. In FIG. 1(b), the right boot block 13R is shown as being articulated by pulling on hand lever 21L, which is attached by cable 21C to the variable angle adjustment device 5. Legs 12L, 12R and connecting members 23L, 23R are attached to right and left chair rails 14L, 14R by releasable pins 6.

Figure 1C:
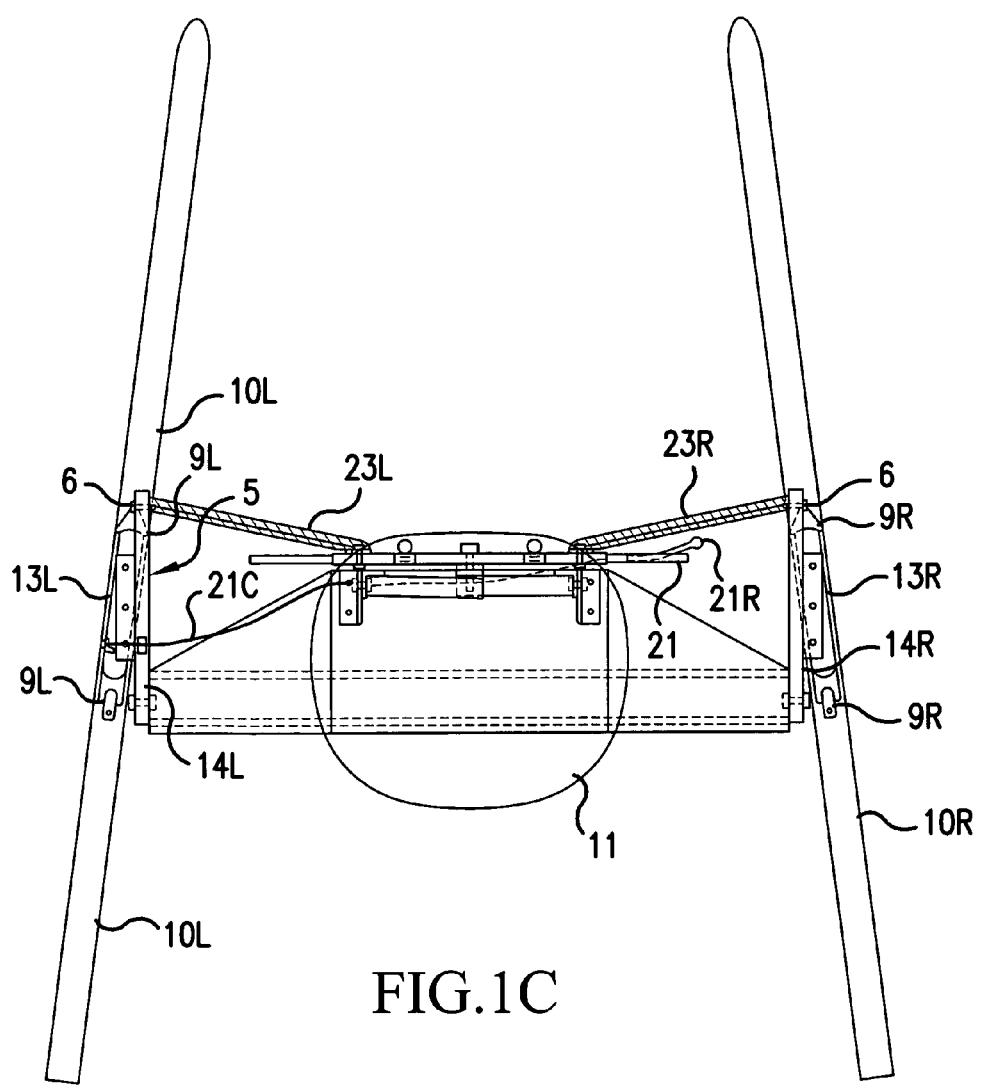

FIG. 1(c) is a top down view of the first embodiment showing chair rails 14L, 14R parallel to each other and skis 10L, 10R toed inwardly. Details of the toe-in mechanism will be provided below.

As can be seen in FIGS. 1(a) and 1(c), boot blocks 13L1, 13R fit into a standard ski bindings 9L, 9R. Boot blocks 13L, 13R are the same and may be used interchangeably on either ski 10L, or 10R.

Also, the seat 11 is inclined to the rear, and the rider's center of gravity is located between legs 12L, 12R and connecting member 23L, 23R.

Figure 2A:
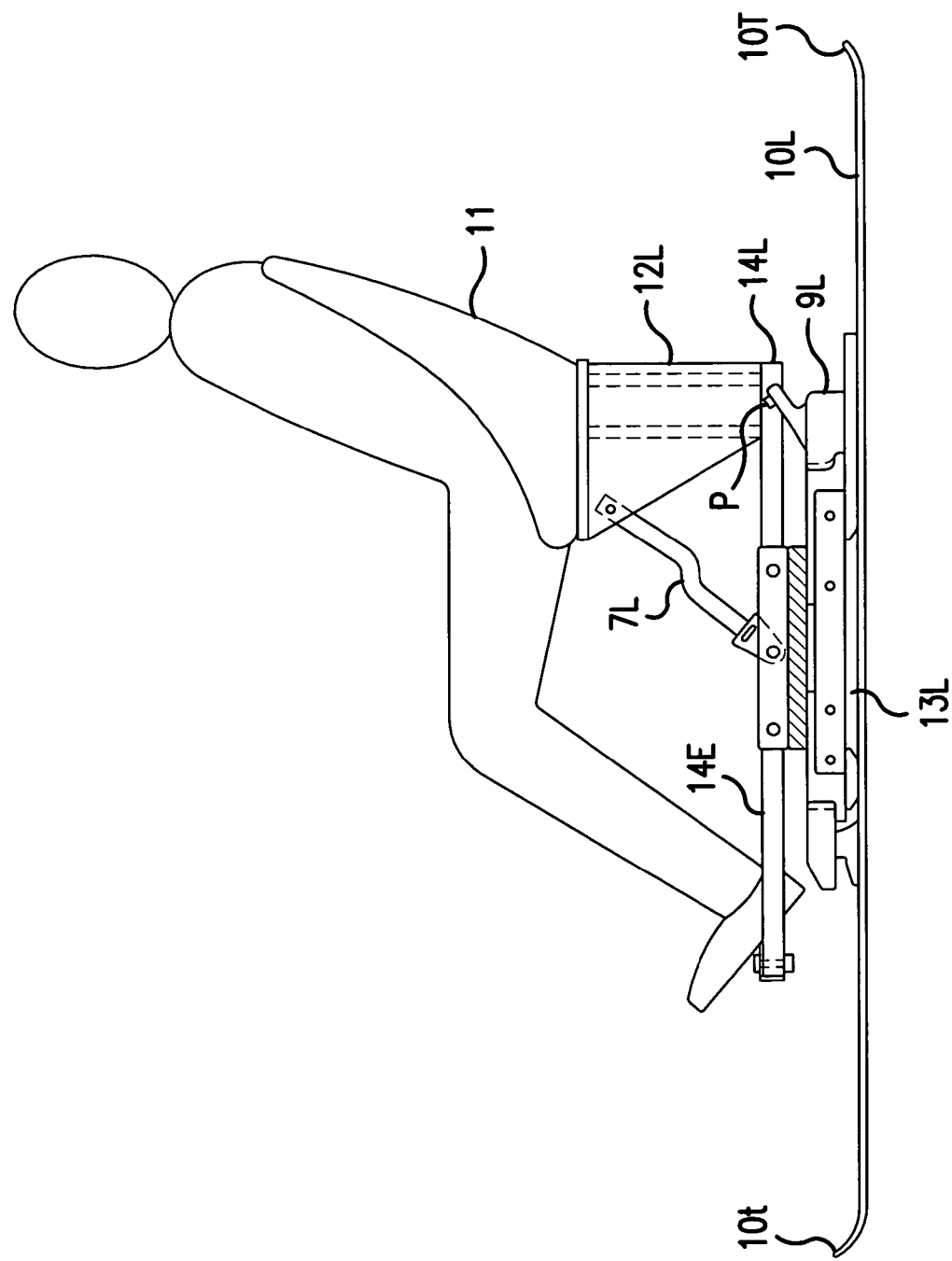

The second embodiment will be described with reference to FIGS. 2(a)–(c). FIG. 2(a) shows a side view of the ski sled 1, including left ski 10L, seat 11 (go-cart seat), left leg 12L, left chair rail 14L, left adjustable boot block 13L, foot-operated weight transfer device 8 which includes chair rail extensions 14E.

Figure 2B:
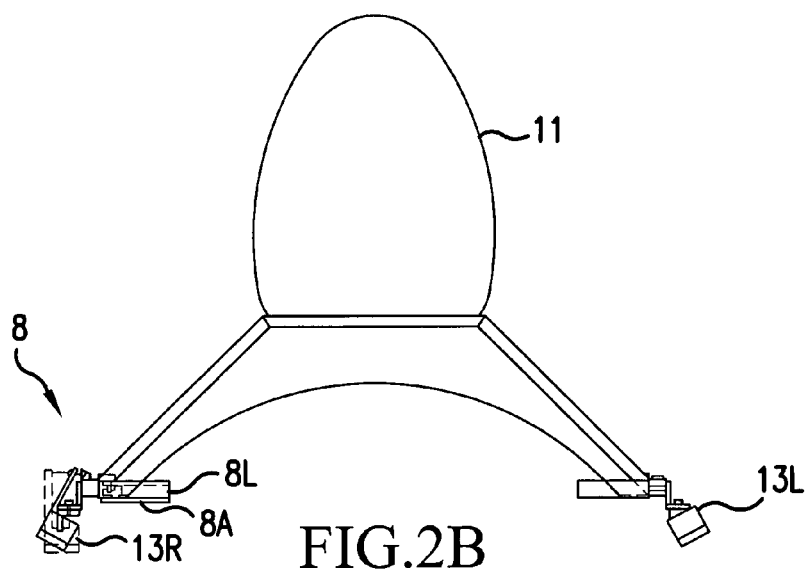

FIG. 2(b) is a front view of the seat 11 (bucket go-cart seat) and weight transfer device 8 of the second embodiment of the present invention. The weight transfer device 8 includes cable activators (pedals) 8A, which are attached under left and right foot pegs 8L, 8R mounted on forward ends of chair rail extensions, for pulling cable 8Cs attached respectively to variable angle adjustment devices 5 for articulating left and right boot blocks 13L, 13R. In FIG. 2(c), the left boot block 13L is shown as being articulated by pressing on left foot pedal (peg) 8L.

Figure 2C:
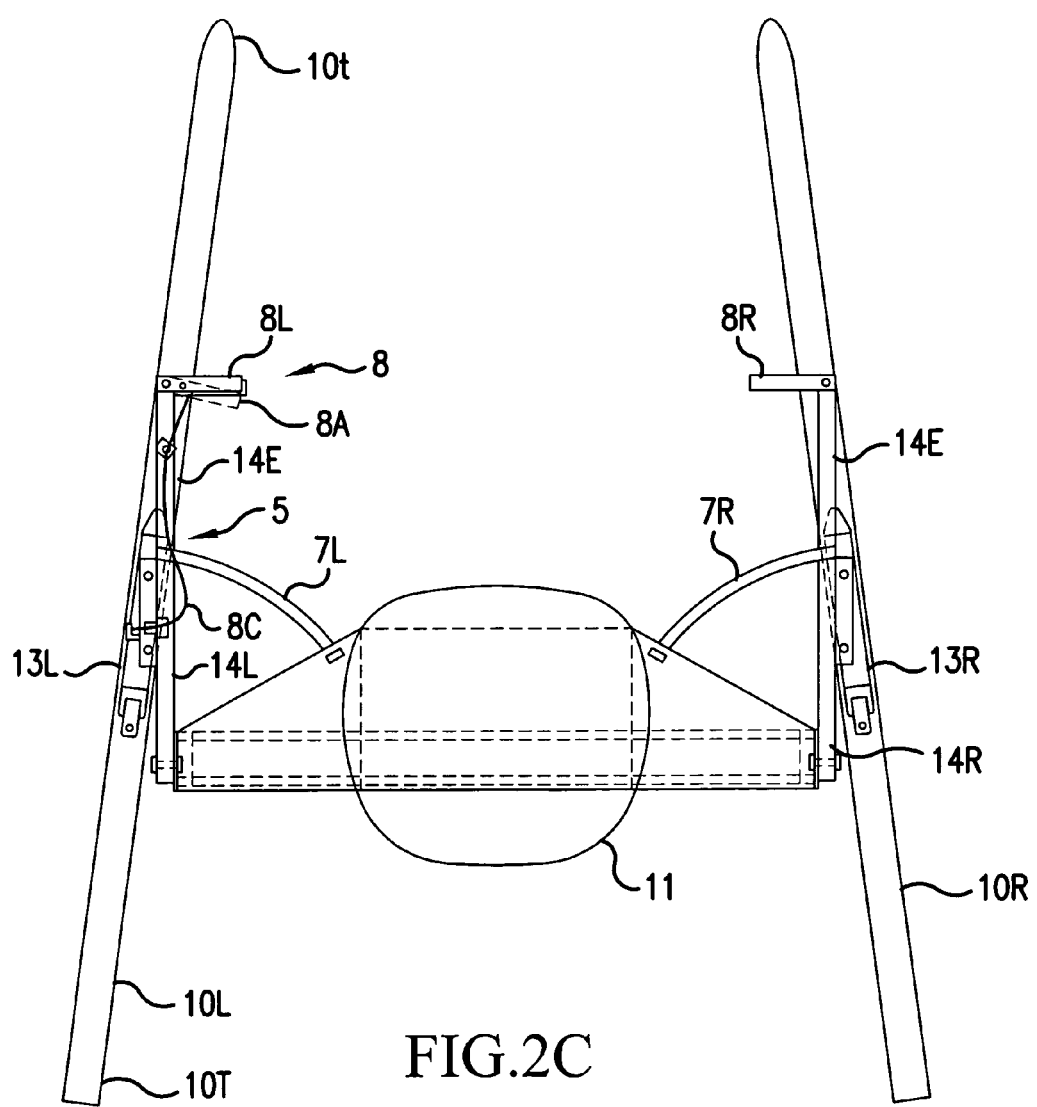

FIG. 2(c) is a top down view of the second embodiment showing chair rails 14L, 14R parallel to each other and skis 10L, 10R toed inwardly.

FIGS. 2(a) and (c) show straps 7L, 7R which are provided to prevent seat 11, which is attached to each of the chair rails 14L, 14R by pivot pins P, from falling over backwards. Unlike the first embodiment described above, the second embodiment does not have connecting member 23L, 23R. Instead, the seat is held upright when the rider's feet are placed on foot pedals (pegs) 8L, 8R.

Figure 3A:
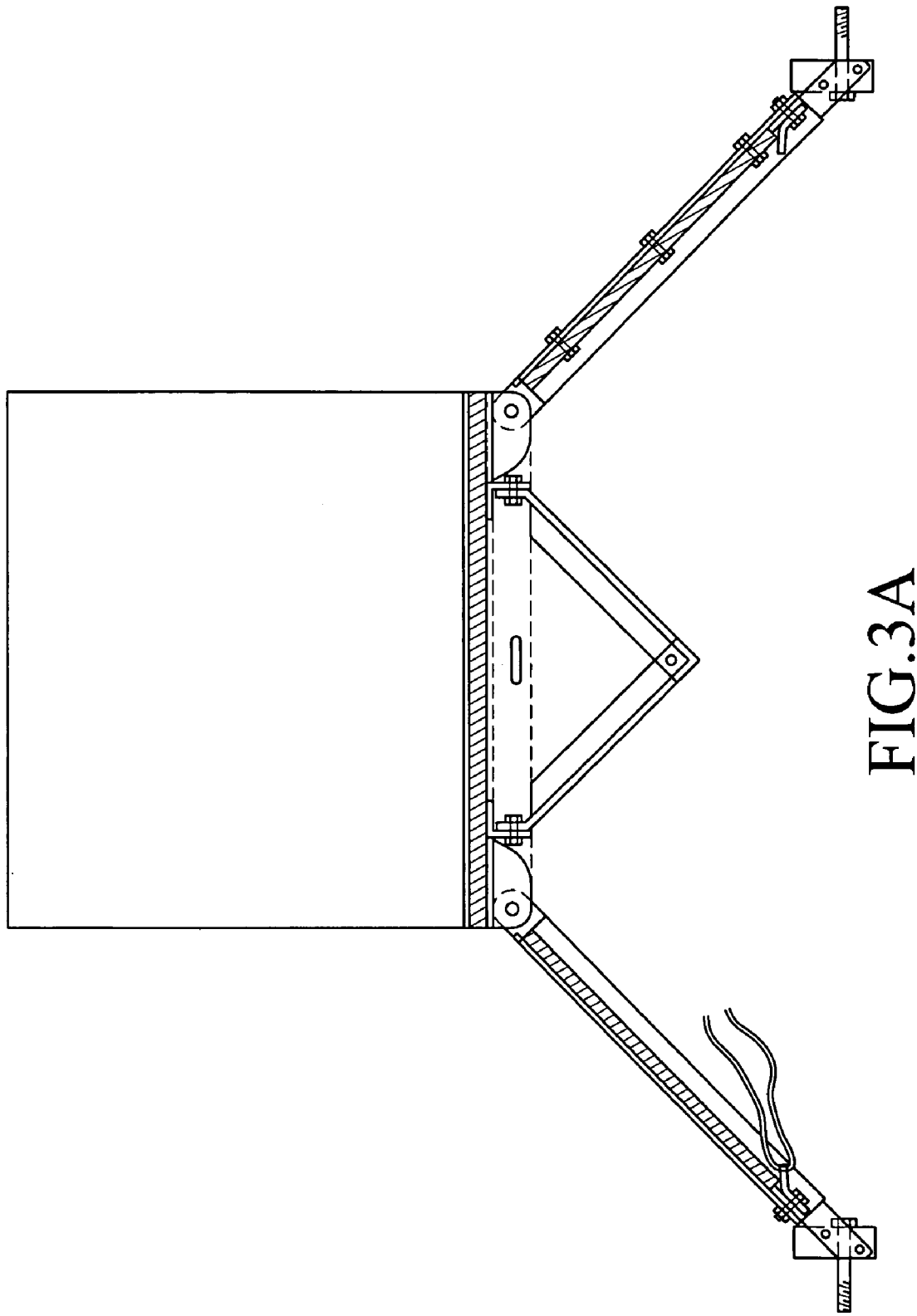
FIGS. 3(a)–(b) show front and side views of a folding seat configuration of the present invention, and FIG. 3 (c) shows the seat being a go-cart seat.
Figure 3B:
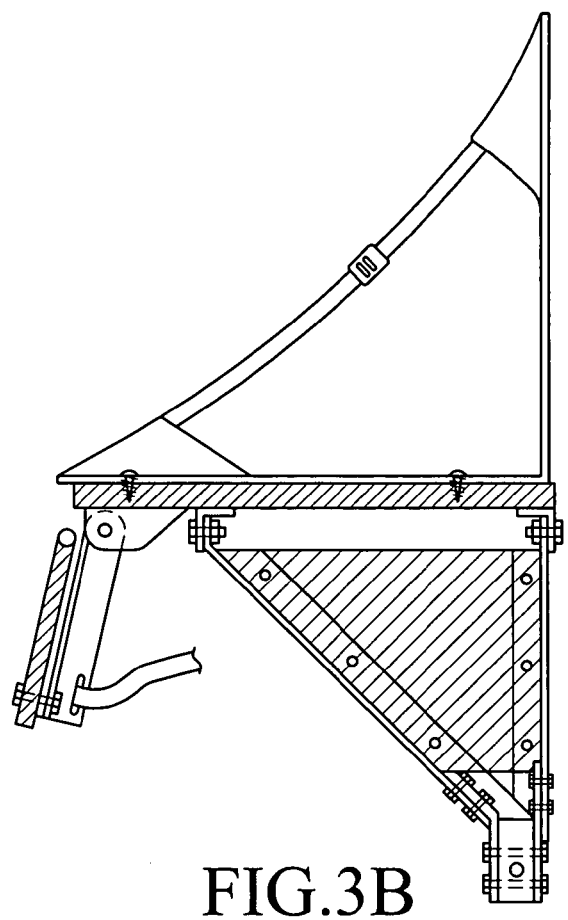
Figure 3C:
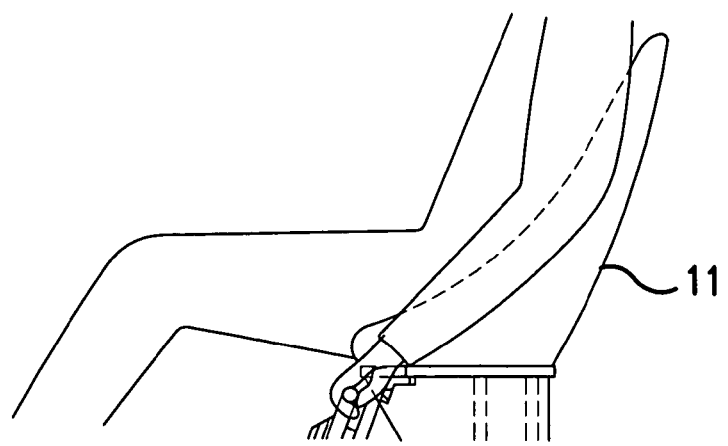

FIGS. 3(a)–(c) show various examples of the seat of the ski sled of the present invention, with FIGS. 3(a) and (b) being front and side views of a collapsible folding seat, FIG. 3(c) being a bucket go-cart seat.

Figure 4:
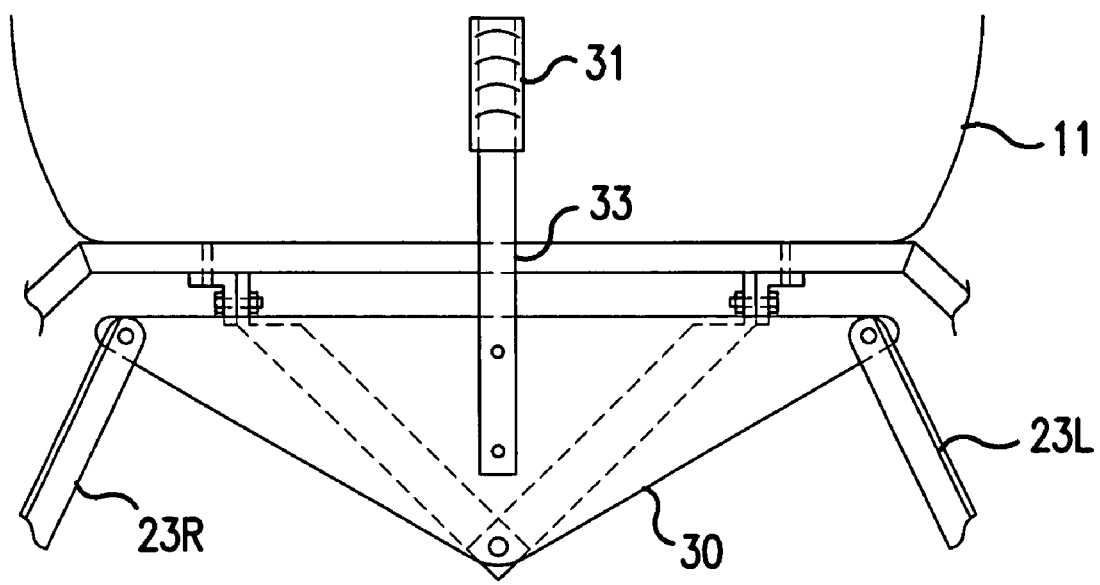
FIG. 4 shows a third embodiment (aircraft yoke steering) of the weight transfer device.
Figure 12:
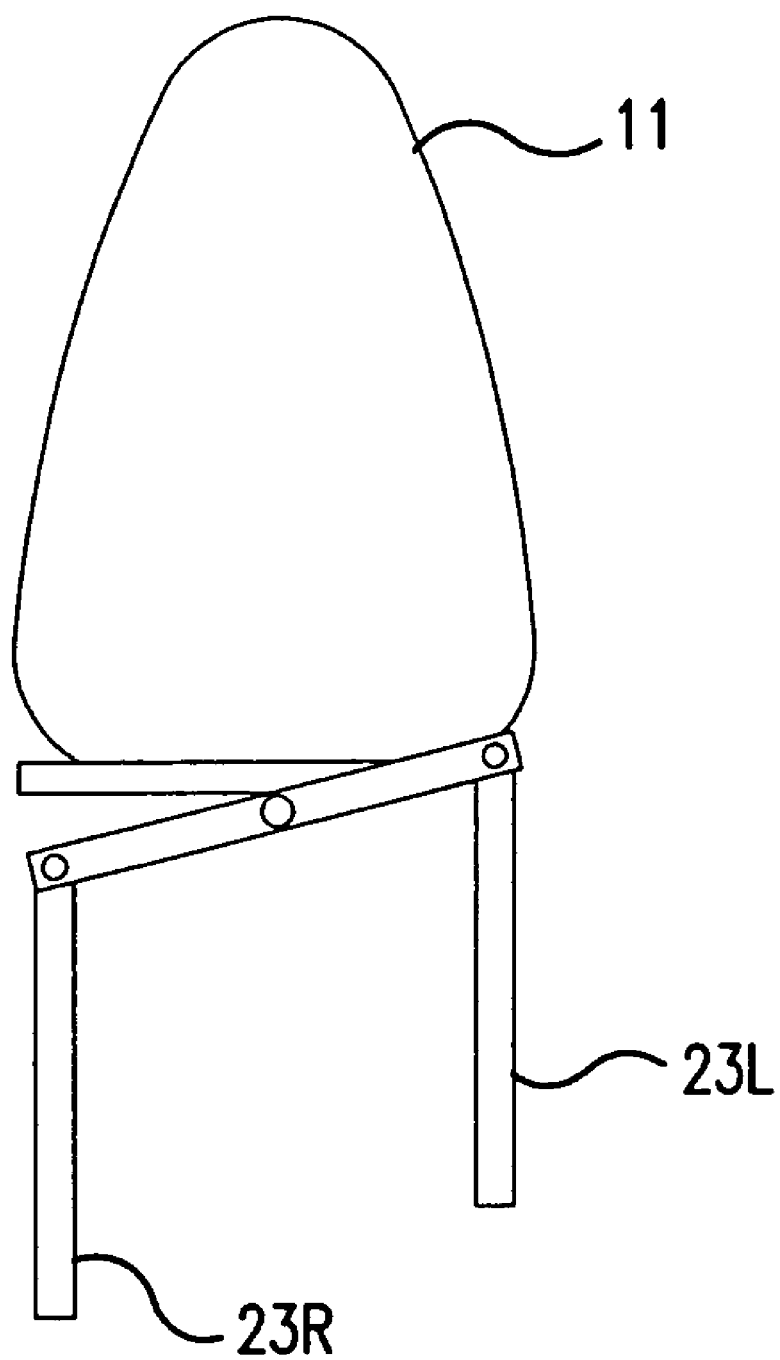
FIG. 12 is a simplified front view sketch of a weight transfer operation in which more weight is put on one ski while weight is taken away from the other ski.

FIG. 4 shows a third embodiment of the weight transfer device (aircraft yoke steering) in which pivot member 30 is attached to a midpoint of the seat, and vertical steering handle 31 is attached by hinge 33 to the pivot member 30. The steering handle is moved to the left or right to apply downward pressure on either the left or right extending members 23L, 23R which are attached at upper ends to pivot member 30. The hinge 33 allows the steering handle 31 to be folded down (in a forward direction) when sitting or getting up from the seat 11. With the third embodiment, weight transfer from one ski to the other is accomplished by pressure applied to connecting member 23L, 23R as shown in FIG. 12.

Figure 5A:
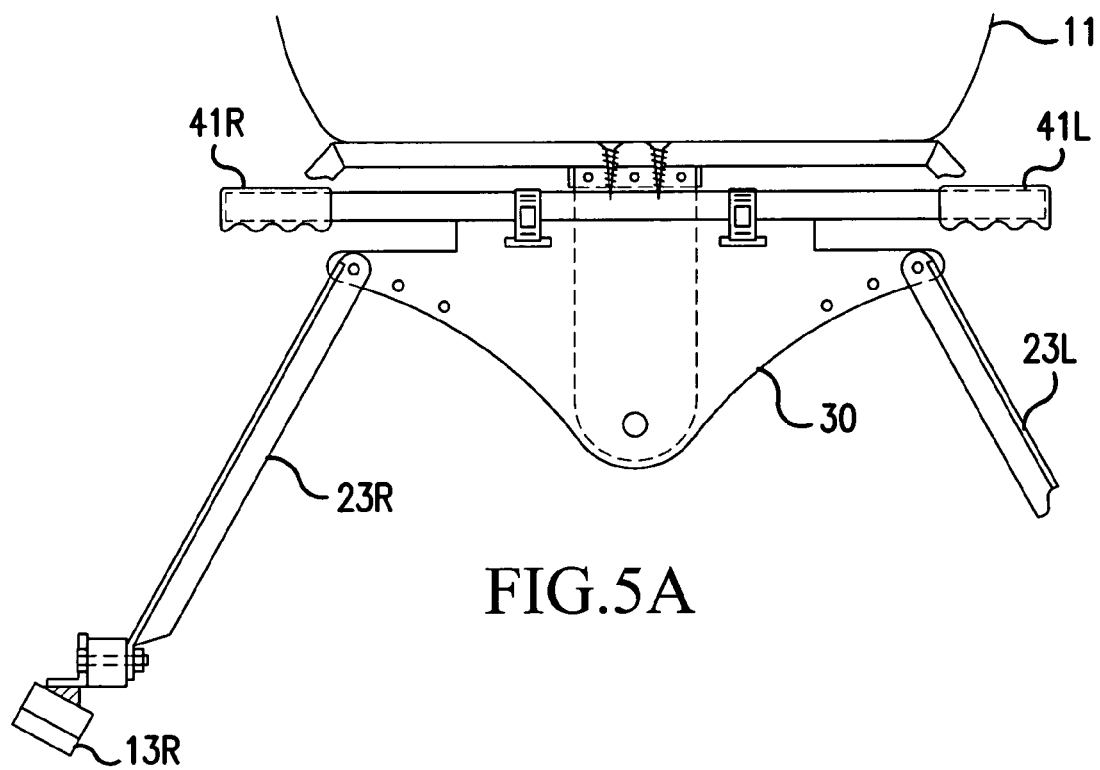
FIGS. 5(a) and (b) show a fourth embodiment (handlebar steering) of the weight transfer device.
Figure 5B:
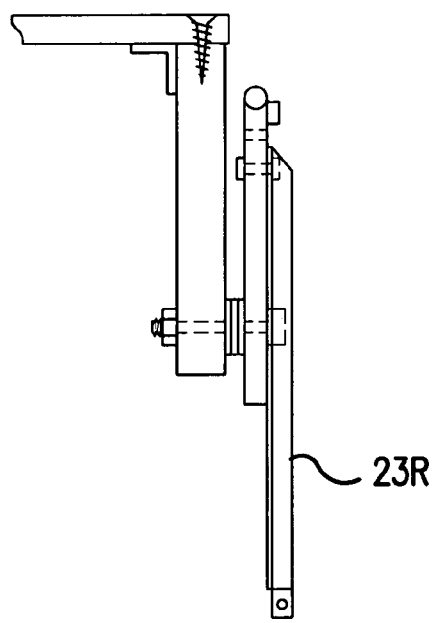

FIGS. 5(a) and (b) show a fourth embodiment of the weight transfer device (handlebar steering with no brake levers) in which left and right hand grips 41L, 41R attached to pivot member 30 can be grasped on ends thereof to apply a steering force through connecting members 23L, 23R which are fixed at upper ends thereof to pivot member 30. The pivot member is suspended from a front portion of seat 11. With the fourth embodiment, weight transfer from one ski to the other is accomplished by pressure applied to connection members 23L or 23R as shown conceptually in FIG. 12.

Figure 6A:
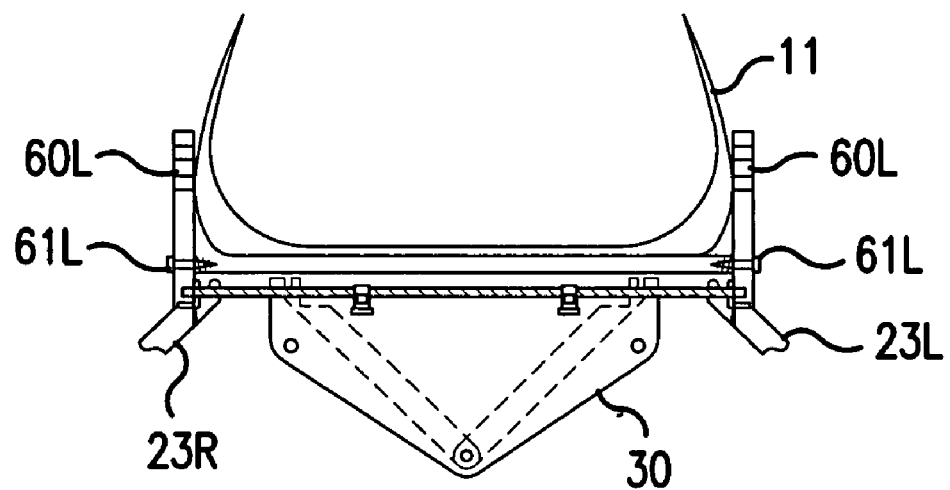
FIGS. 6(a) and (b) show a fourth embodiment (tractor steering) of the weight transfer device.
Figure 6B:
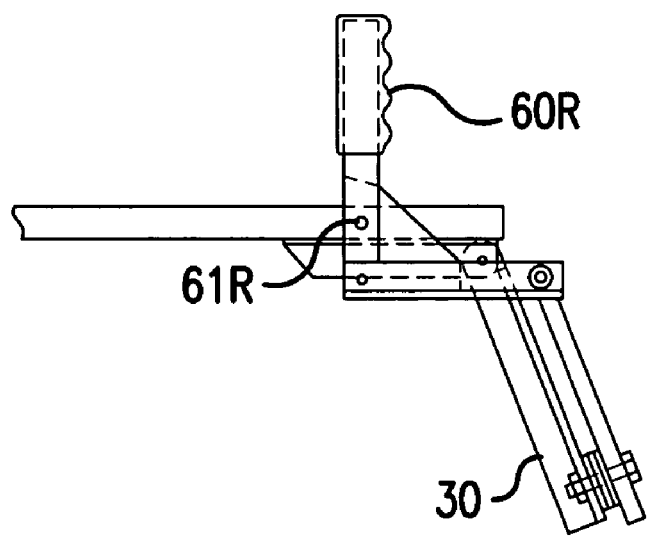

FIGS. 6(a) and (b) shows front and side views of a fifth embodiment. In this embodiment, left and right tractor steering handles 60L, 60R are provided instead of the hand levers (embodiment 1), the foot pedals (embodiment 2), the yoke steering handle (embodiment 3), or the handle bar (embodiment 4). Tractor steering handles 60L, 60R attached to seat 11 by pins 61L, 61R and are connected to pivot member 30 for shifting weight through connecting members 23L, 23R to either of the skis 10L, 10R.

Figure 7A:
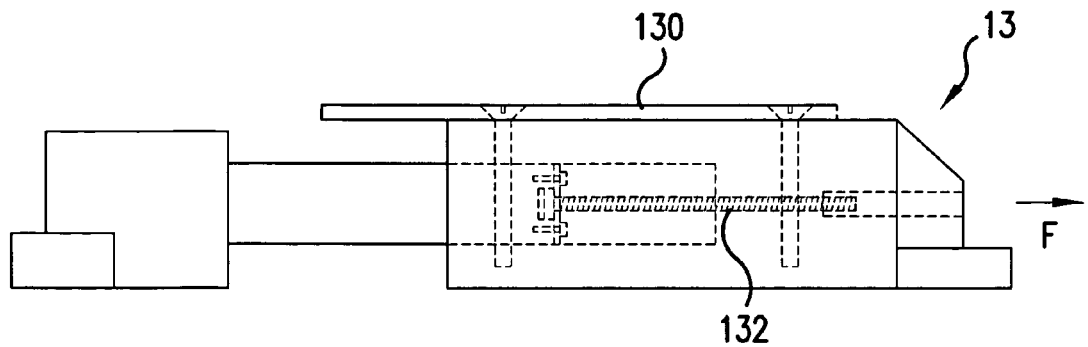
FIGS. 7(a) and (b) are side and top down views of the adjustable boot block with a mounting plate.
Figure 7B:
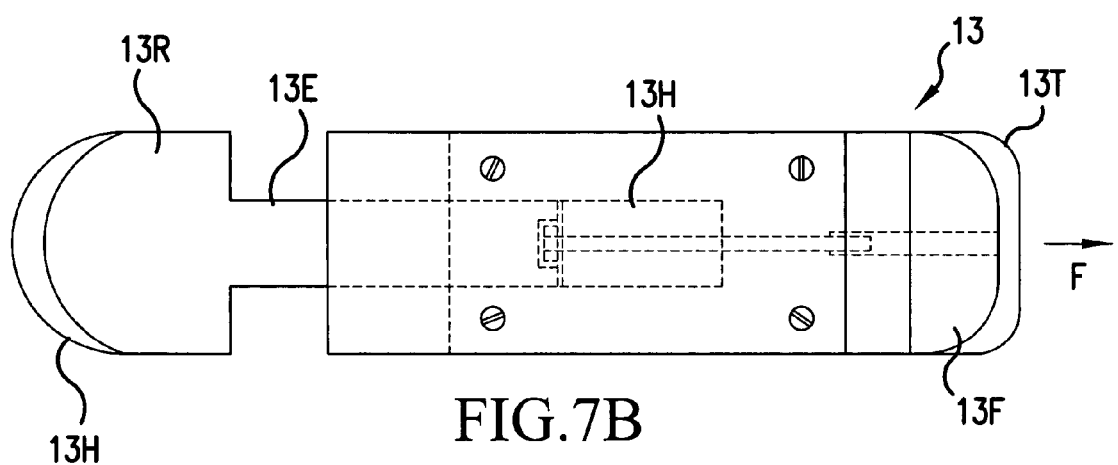
FIG. 7(c) shows the detail of the adjuster mechanism of the adjustable boot block.
Figure 7C:
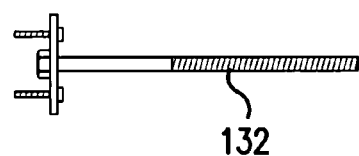

FIGS. 7(a) and (b) are side and top down views of the boot block 13 with a mounting plate 130 attached to the boot block 13 by screws. The designation F indicates the front of the boot blocks. FIG. 7(b) shows the detail of the lengthwise adjuster mechanism 132 inserted into a hole at the front end of each adjustable boot block 13 for the purpose of adjusting the length of the boot blocks 13 to the bindings 9 of the skis, as shown in FIGS. 1(a) and 2(a). Also shown in FIG. 7(b) are forward section 13F of the boot block 13 with toe piece 13T and rear hole 13H, rear section 13r, heal piece 13h, and forward extension 13E.

Figure 8A:
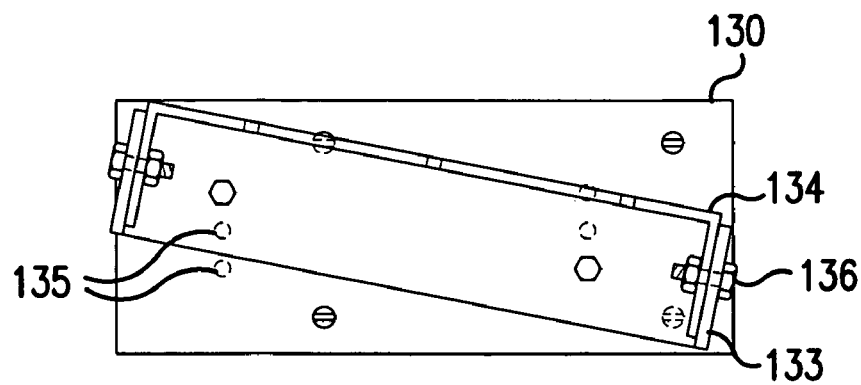
FIGS. 8(a), (b), and (c) are side, top down, and end views of the fixed bracket and the rotatable bracket included variable angle adjustment device of the present invention.
Figure 8B:
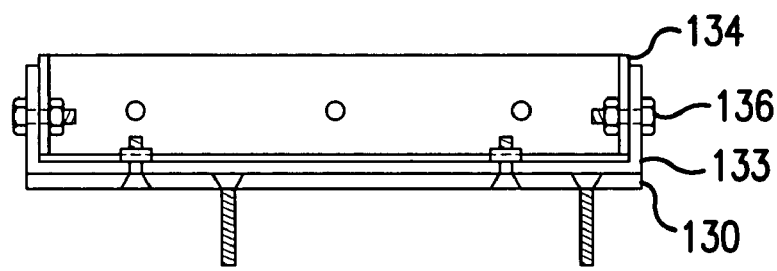
Figure 8C:
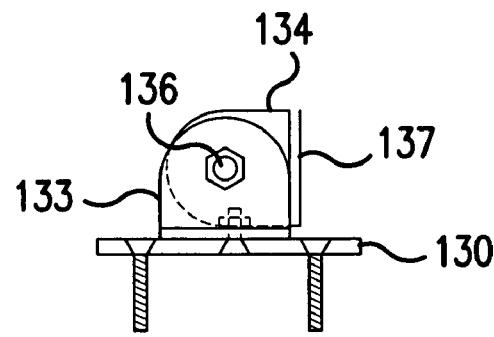

FIGS. 8(a), (b), and (c) show side, top down, and end views, respectively, of the toe-in mechanism, including the fixed bracket 133, the rotatable bracket 134, and fixing members 136 which firmly hold together the fixed bracket 133 and the rotatable bracket 134. Chair rails 14 (shown in FIGS. 1(c) and 2(c)) are attached to inside faces 137 of rotatable brackets 134. As shown in FIG. 8(b), position adjustment holes 135 are provided on the fixed angle brackets 133 for adjusting the longitudinal angle of the fixed angle brackets 133 with respect to the longitudinal direction the flat mounting plate 130 fixed to each boot block 13. By altering the longitudinal angle of the fixed angle brackets 133, the toe-in angle of the ski sled can be easily adjusted to accommodate riders having different abilities, as well as for varying snow and ski slope conditions. Bolt attachments are shown here, but other attachable/detachable mounting attachments are possible.

FIGS. 9(a) and (b) show side and top down views of the left chair rail 14L attached to the left articulating boot block 13 equipped with a variable angle adjustment device 138 having an infinite angle pivot adjuster mechanism 139. The chair rail 14L is attached to the boot block as can be seen in both FIGS. 9(a) and (b). Note in FIG. 9(b) that the chair rail 14L is mounted at an angle relative to the boot block 13L, which means the left ski is toed-in. The toe-in angle is adjustable for riders of different abilities and for different snow conditions.

FIG. 9(b) shows cable 21C, 8C, which is operable by either the hand lever 21 R (shown in embodiment 1, FIG. 1(c)), or foot pedal (peg) 8L (shown in embodiment 2, FIG. 2(c)).

Figure 10A:
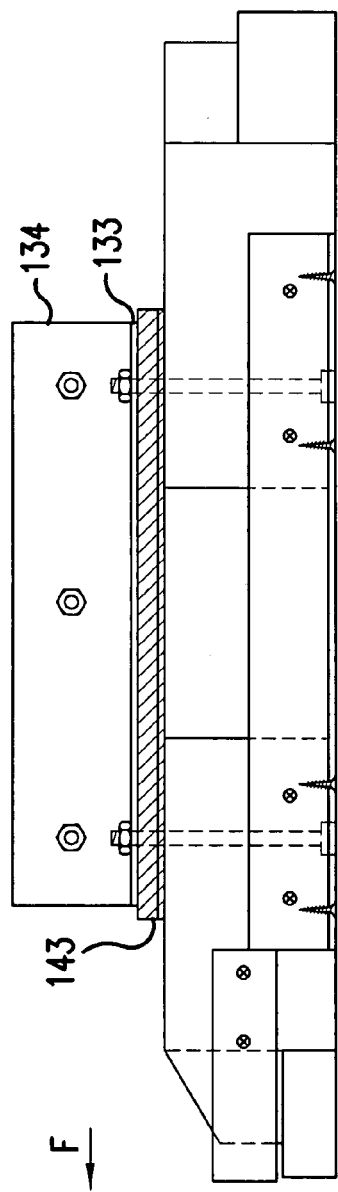
FIGS. 10(a), (b), and (c) show side, top down, and end views of the left chair rail attached to the left boot block through a fixed angle adjustment device equipped with multiple fixed angle blocks.
Figure 10C:
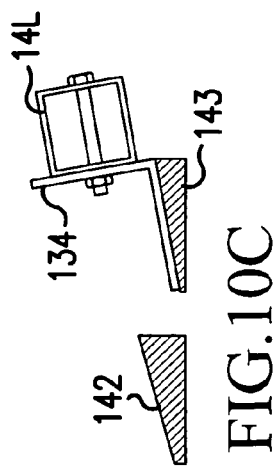
Figure 10B:
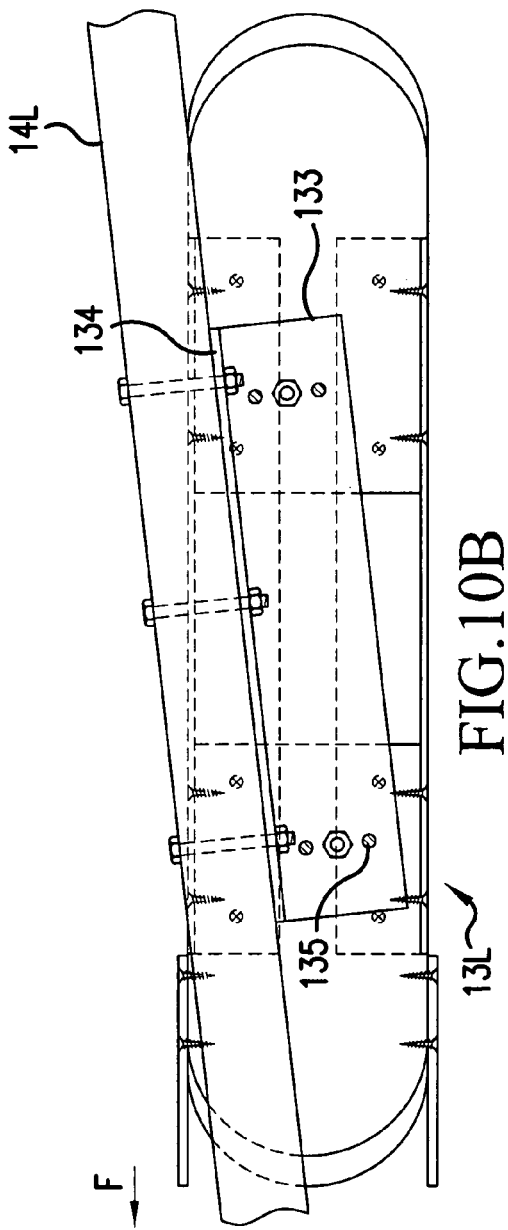

FIGS. 10(a), (b), and (c) show side, top down, and end views of the left chair rail attached to the left boot block through a fixed angle adjustment device 140 equipped with multiple fixed angle blocks 141, 142, 143. Blocks 141, 142, 143 may be substituted on the boot blocks to accommodate riders having different abilities as well as for different snow and slope conditions.

Other elements described above are not repeated here.

Figure 11A:
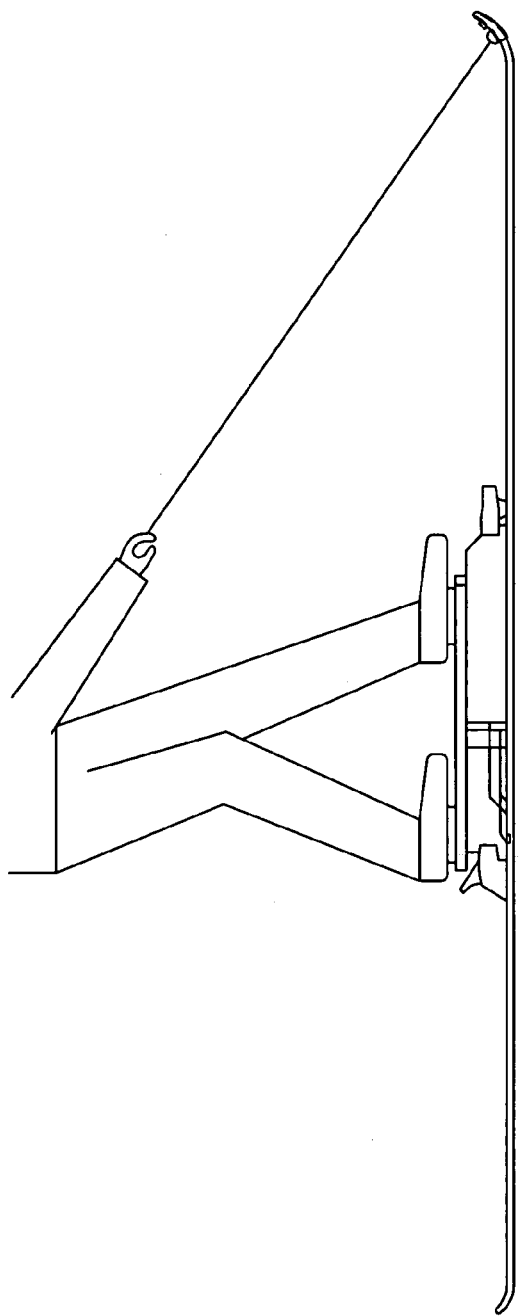
FIGS. 11 (a) and (b) show side and front views of a single boot block attached to a mono-ski, with FIGS. 11 (c) and (d) showing detailed side and top down views of the foot plate and braking mechanism of the single boot block.
Figure 11B:
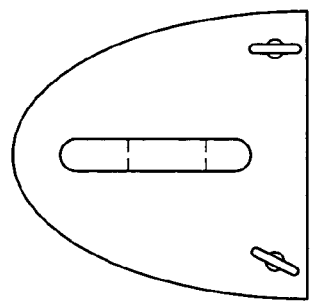

FIGS. 11 (a) and (b) show side and front views of a single boot block attached to a mono-ski, with FIGS. 11 (c) and (d) showing detailed side and top down views of the foot plate and "run away ski" braking mechanism of the single boot block.

Applications for the ski sled of the present are many.

For handicapped skiers, the invention provides a sled with a comfortable seat that is easy to sit in and stand up from. The sled is suitable for either ski slopes rated as "green" or "mild blue". Further, the sled can be easily adapted to a rope tow or a J-bar lift. In addition, the sled is practical to use on back yard hills.

For beginning and handicapped skiers, the sled provides an excellent way for inexperienced skiers to experience the feeling and mechanics of skiing around a mountain, giving the rider a true taste of the skiing experience.

For expert skiers, the fold up version provides the mobility to ski downhill on "black diamond" slopes, with the sled being carried on the skier's back. When a "green" or "blue" slope is approached, the skier can snap the seat onto the skis, sit back and relax as the ski sled glides downward. The foldable seat version is particularly suited to back country skiers.

A wide stance, foot steer version of the present invention with a seat belt could even be used with a wind-powered traction kite, giving the user holding the traction kite the run of the country side when it snows.

Operation of the ski sled is simple. The skis are set in a ski stance, with the inner edges bearing and distributing the weight at proper places on the skis. For the first embodiment of the present invention, to turn left, pull on the right hand lever on the end of the handle bar. To turn right, pull on the left hand lever on the handle bar. The other embodiments operate is a similar manner.

Production of the ski sled can be made simple by merely using a few lightweight, molded plastic, metal or composite parts, assorted bars and handles, fasteners for connecting the parts devices, an instruction sheet, and a traveling bag.

Numerous variations to the above-described embodiments are to be considered within the scope of this invention. For example, a prone platform may be substituted for a seat. Various types of skis may be used including cross-country skis, mountaineering skis, and downhill skis of many styles. The sled may be adapted with a hand or foot operated braking mechanism to cause a dragging force in the snow. Various attachment mechanisms are possible, such as quick-release fastening devices, screws and other adjustment mechanisms, and hydraulic activators. Gas shock absorbers or springs may be included in the legs and or the connecting members. A heavy-duty version of the ski sled may include an extruded aluminum swing arm, bucket seat, with a fully articulated suspension and harness.

A motor sled is possible using a small horsepower motor and a tank track or tread device for applying power to the snow.

These and other variations are not to be regarded as a departure from the spirit and scope of the invention, and all such modifications as would be obvious to one skilled in the art are intended to be included within the scope of the following claims.

What is claimed is:

1. A ski sled comprising:
   two skis arranged side-by-side with inward edges of the skis being angled downwardly at least while the sled is turning;
   a seat supported by right and left legs, the legs being rotatably attached at respective pivot points at a rear end of right and left chair rails, rotation of the seat forward and backward enabling a transfer of a partial weight of a rider from tip to tail of the skis;
   adjustable blocks fitting into ski bindings on the skis, the blocks having angle adjustment devices mounted thereon for changing lateral pitches of the two skis, the chair rails being attached to the angle adjustment devices and the angle adjustment devices being attached to the blocks forward of the pivot points; and
   a weight transfer device operable by a rider for transferring the partial weight of the rider forward and backward and from one of the two skis to the other, thus enabling the ski sled to turn.

2. The ski sled according to claim 1, wherein the weight transfer device comprises:
   hand-levers mounted adjacent to each side of the seat;
   cables extending from the hand-levers and being connected to the angle adjustment devices so that when the hand lever on one side of the sled is pulled, the block on an opposite side of the sled is articulated; and
   right and left connecting members having lower ends attached to forward portions of the chair rails, and upper ends attached to right and left sides of a pivot member pivotably attached to the seat.

3. The ski sled according to claim 2, wherein the weight transfer device includes a linkage attachment pivotably attaching the weight transfer device to the seat.

4. The ski sled according to claim 1, further comprising:
right and left connecting members having lower ends attached to forward portions of the chair rails, and upper ends attached to right and left sides of a pivot member which is pivotably attached to the front portion of the seat.

5. The ski sled according to claim 1, wherein each of the legs is rotatably attached by a pin extending laterally through a respective one of the chair rails, whereby the seat and the chair rails are not rotatable with respect to each other only in the lateral direction.

6. The ski sled according to claim 1, wherein the weight transfer device comprises:
a pivot member pivotably attached at a mid-point thereof to a pivot pin adjacent to a front portion of the seat;
a steering handle extending vertically from the pivot member;
two connecting members having lower ends attached to forward portions of the chair rails, and upper ends attached to right and left sides of the pivot member.

7. The ski sled according to claim 1, wherein the weight transfer device comprises:
a pivot member pivotably attached at a mid-point thereof to a pivot pin adjacent to a front portion of the seat;
tractor handles extending vertically from the pivot member;
two connecting members having lower ends attached to forward portions of the chair rails, and upper ends attached to right and left sides of the pivot member.

8. The ski sled according to claim 1, the blocks comprising:
a forward section having a toe piece and a rear hole;
a rear section having a heel piece and a forward extension, the forward extension being inserted into the rear hole of the front section, the forward section being provided with an adjuster mechanism for adjusting a longitudinal position of the forward section relative to the rear section, so that the adjustable blocks are capable of fitting multiple ski bindings of the skis;
an adjustable bracket attachable to the blocks in a plurality of different angles with respect to the longitudinal direction of the blocks to accommodate different toe-in angles of skis to which the blocks are mounted.

9. The ski sled according to claim 8, wherein the angle adjustment device is a variable angle adjustment device connected to a lever operable by the rider in order to change the lateral pitch of the skis.

10. The ski sled according to claim 8, wherein the angle adjustment device includes multiple fixed-pitch angle blocks having different slopes, the different fixed pitch angle blocks being substituted one for another in order change the lateral pitch of the skis.

11. The ski sled according to claim 1, wherein the seat supported by the right and left legs rotatably attached at the pivot points at the rear end of the right and the left chair rails is a bucket seat.

12. The ski sled according to claim 1, wherein the seat is a foldable seat.

13. A ski sled comprising:
two skis arranged side-by-side with inward edges of the skis angled downwardly at least while the sled is turning;
a seat supported by right and left legs, the legs being rotatably attached at respective pivot points at a rear end of right and left chair rails;
adjustable blocks fitting into ski bindings on the skis, the blocks having angle adjustment devices mounted thereon for changing lateral pitches of the two skis, the chair rails being attached to the angle adjustment devices and the angle adjustment devices being attached to the blocks forward of the pivot point; and
a weight transfer device operable by a rider for transferring a partial weight of the rider forward and backward and from one of the two skis to the other, thus enabling the ski sled to turn, the weight transfer device including:
chair rail extensions extending forwardly from the chair rails;
foot pedals rotatably attached to the chair rail extensions for actuating cables connected to the angle adjustment devices so that when the foot pedal on one side of the sled is pushed, the block on the same side of the sled is articulated,
the foot pedals enabling a transfer of a partial weight of a rider from tip to tail of the skis,
wherein an axis of rotation of each of the foot pedals is substantially vertical.

14. The ski sled according to claim 13, further comprising pivot pins rotatably attaching the legs to the chair rails.

15. The ski sled according to claim 13, further comprising a pair of straps connected to front parts of the seat for preventing the seat from falling over backwards.

16. The ski sled according to claim 13, wherein the seat is held upright when a rider's feet are placed on the foot pedals.

17. The ski sled according to claim 13, wherein rotation of the seat forward and backward enables the transfer of the partial weight of the rider from the tip to the tail of the skis.

18. The ski sled according to claim 13, the blocks comprising:
a forward section having a toe piece and a rear hole;
a rear section having a heel piece and a forward extension, the forward extension being inserted into the rear hole of the front section, the forward section being provided with an adjuster mechanism for adjusting a longitudinal position of the forward section relative to the rear section, so that the adjustable blocks are capable of fitting multiple ski bindings of the skis;
an adjustable bracket attachable to the blocks in a plurality of different angles with respect to the longitudinal direction of the blocks to accommodate different toe-in angles of skis to which the blocks are mounted.

19. The ski sled according to claim 13, wherein the angle adjustment devices are variable angle adjustment devices connected to the foot pedals operable by the rider in order to change the lateral pitch of the skis.

20. The ski sled according to claim 13, wherein each of the legs is rotatably attached by a pivot pin extending laterally through a respective one of the chair rails,
whereby the seat and the chair rails are rotatable with respect to each other only in a forward and backward direction enabling the transfer of the partial weight of the rider from the tip to the tail of the skis.

* * * * *